March 1, 1960 L. F. OZLEK 2,926,925
CADDY GOLF CARTS
Filed July 9, 1958 2 Sheets-Sheet 1
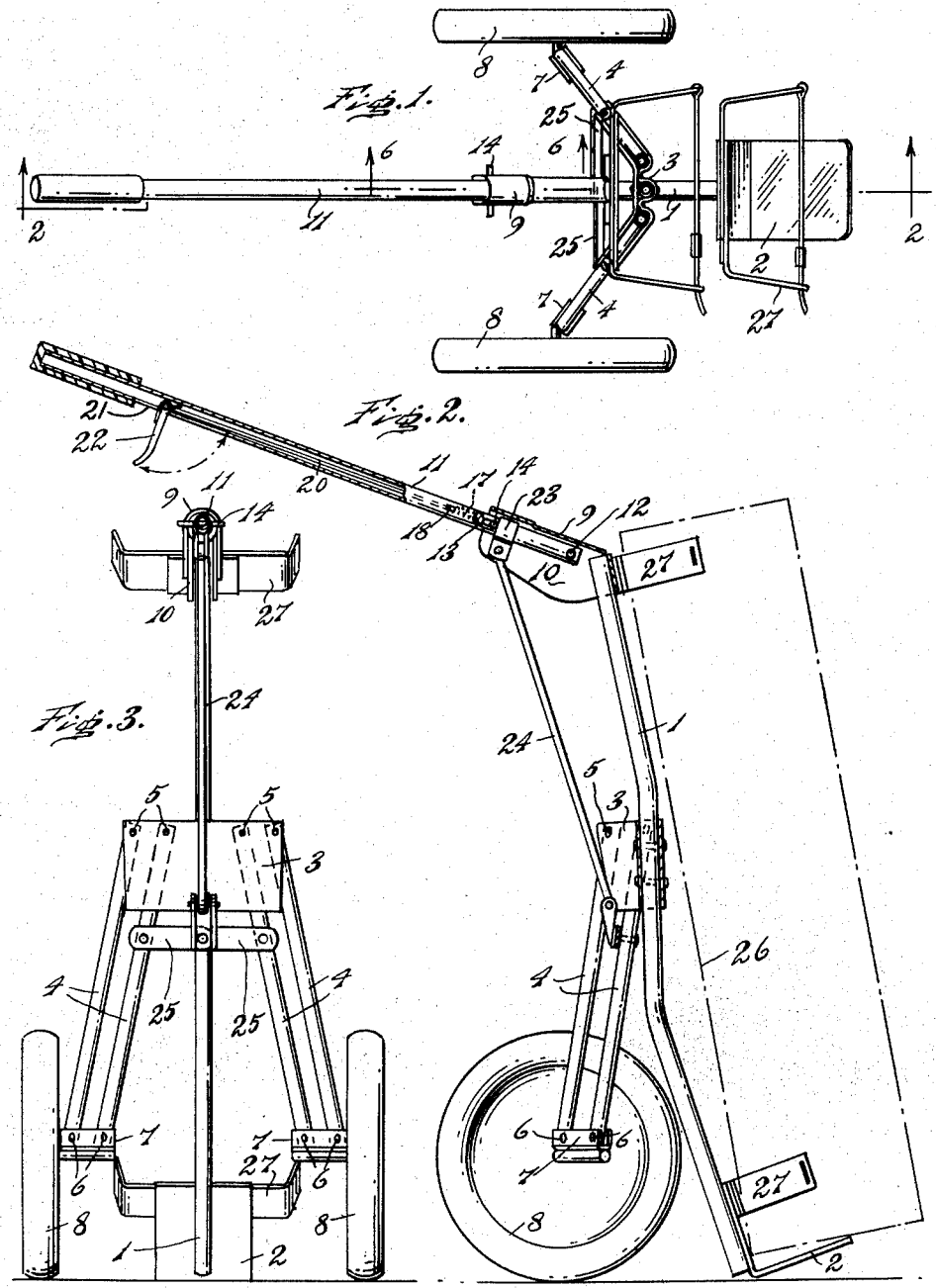
INVENTOR
Leon F. Ozlek
BY
Herbert S. Fairbanks
ATTORNEY

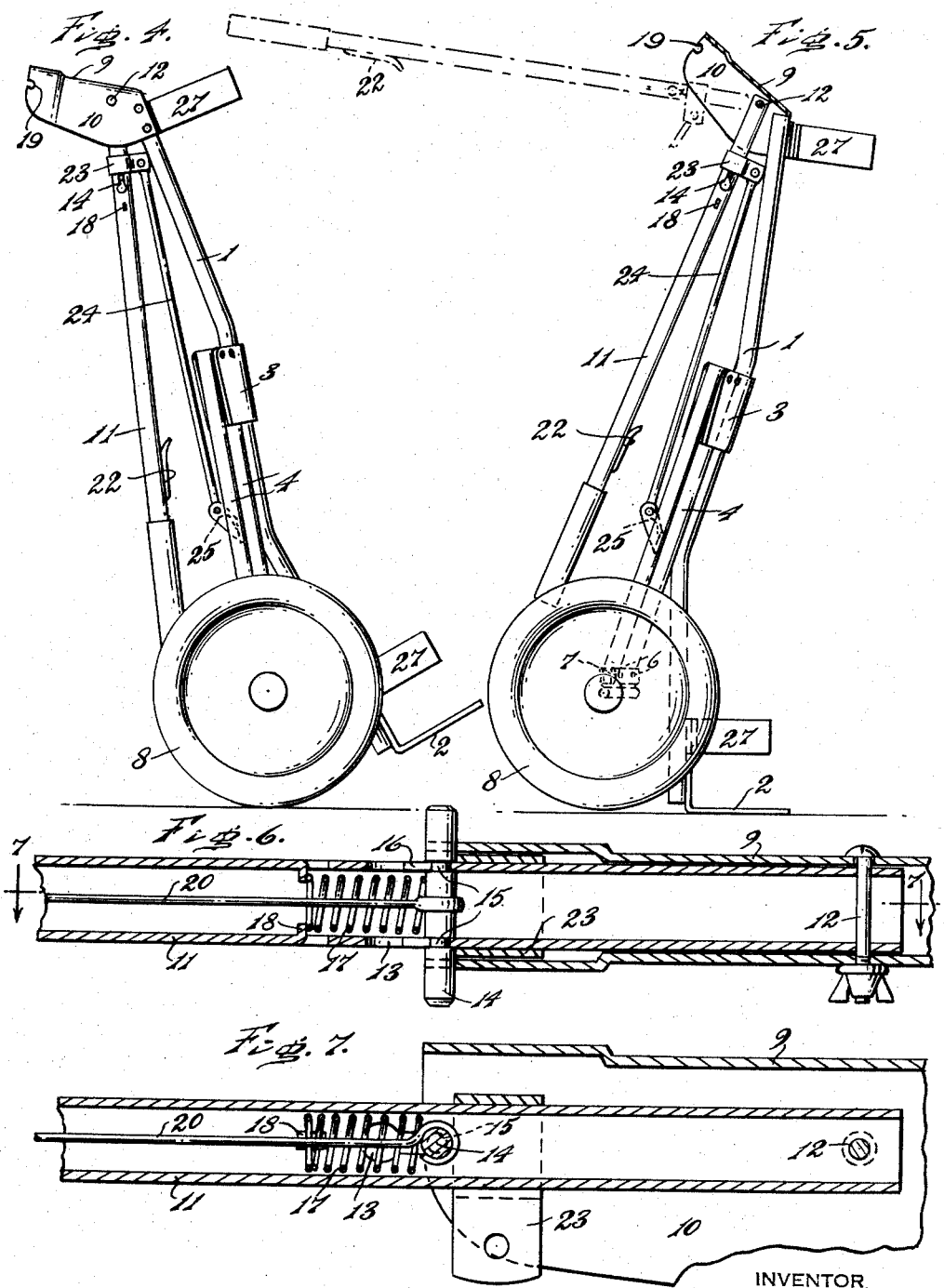

2,926,925
CADDY GOLF CARTS

Leon F. Ozlek, Philadelphia, Pa.

Application July 9, 1958, Serial No. 747,388

2 Claims. (Cl. 280—42)

In the manufacture of golf carts, it has been customary to provide locking mechanism to maintain them in locked condition, and, when the locking mechanism is released, the golf cart can be folded into a substantially flat condition.

The operation of locking and releasing the locking mechanism has heretofore required the two hands of the operator. In this invention, the locking and releasing action of the locking mechanism and the folding or expansion of the golf cart can be accomplished by a single hand of the operator.

A further object of the invention is to devise a novel construction and arrangement of locking means and novel means for controlling it.

A further object of the invention is to device a novel construction and arrangement of the component parts of the golf cart.

A further object of the invention is to devise a novel construction and arrangement of handles, one of which is employed for folding the golf cart and guiding it when in an expanded condition, and the other of which forms a grasping handle for rolling the golf cart when it is in a collapsed condition.

With the foregoing and other objects in view as will hereinafter clearly appear, my invention comprehends a novel golf cart.

It further comprehends a novel construction and arrangement of locking mechanism and novel releasing mechanism for the locking mechanism.

It further comprehends a novel construction and arrangement of the component parts.

For the purpose of illustrating the invention, I have shown in the accompanying drawings a preferred embodiment of it which I have found in practice to give satisfactory and reliable results. It is, however, to be understood that the various instrumentalities of which the invention consists can be variously arranged and organized, and the invention is not limited except by the scope of the appended claims, to the exact arrangement and organization of these instrumentalities as herein set forth.

Figure 1 is a top plan view of a golf cart embodying my invention.

Figure 2 is a section on line 2—2 of Figure 1.

Figure 3 is a rear elevation.

Figure 4 is a side elevation with the golf cart in a collapsed condition.

Figure 5 is a side elevation similar to that of Figure 4 but showing the golf cart as tipped forwardly into the position for the collapsing operation.

Figure 6 is a section on line 6—6 of Figure 1.

Figure 7 is a section on line 7—7 of Figure 6.

Similar numerals of reference indicate corresponding parts.

Referring to the drawings:

The frame of the golf cart has a standard 1 to the lower end of which a bag support 2 is fixed.

The collapsing portion of the frame has clamping plates 3 fixed to the standard 1, and to these plates the upper ends of pairs of dual links 4 are pivoted at 5. The lower ends of the links are pivoted at 6 to members 7 connected with the bearing members of the wheels 8. Each pair of links is located at opposite sides of the standard 1 and diverge downwardly. A bracket 9 has its forward end fixed to the upper end of the standard 1 and is provided with depending sides 10 to and between which the forward end of a handle 11 is pivoted as at 12. The handle has a hole 13 extending laterally through it to receive a locking and releasing member 14 in the form of a rod having spaced annular grooves 15 to prevent relative lateral movement of the rod and bracket 9 when the rod is passed through the hole 13 and moved forwardly into longitudinal side slots 16 in the handle, see more particularly Figures 6 and 7. The forward end of a coil spring 17 contacts the rod and the rear end of the spring contacts an abutment 18 formed by indenting the handle. The spring tends to move the rod forwardly into locking engagement with walls of the recesses 19 in the sides 10 of the bracket 9.

A manually actuated releasing rod 20 is connected at its front end with the rod 14 and its other end terminates in promixity to the grasping portion of the handle 11 and in proximity to a bottom slot 21 into which latter a finger piece or trigger 22 is adapted to extend when the golf cart is in its expanded condition, said finger piece or trigger being suitably tensioned to cause it to be in its slot when the handle 11 is in raised condition.

The trigger is preferably pivoted to the outer end of the releasing rod and a spring tends to move it upwardly into the slot 21, see Fig. 5.

When the locking mechanism is to be released, the trigger is moved downwardly into the position seen in Fig. 2, and held by a finger of the operator in such position. A finger or fingers of the same one hand that grasps the grasping portion of the handle draws the trigger and releasing rod outwardly to release member 14 from engagement with recesses 19 of the bracket 9.

The rear portion of the bracket 9 is preferably of enlarged diameter to form a grasping portion to serve as a handle when the golf cart is collapsed and is to be moved to a new location, and the bracket also serves to conceal a strap 23 fixed to the handle 11. The upper end of a link 24 is pivoted to the strap and at its lower end is pivoted to the lower ends of links 25 the outer ends of which are pivotally connected with one of the pair of dual links 4.

The golf bag 26 is retained in position by straps 27.

The operation of the golf cart will now be apparent and is as follows:

When the golf cart is to be used on the golf field, the handle 11 is in raised position and interlocked with the bracket 9, and the wheel carrying frame is in its expanded condition.

When the player desires to collapse the golf cart, he draws rearwardly on the trigger with the same hand which is gripping the grasping portion of the handle 11, first tipping the golf cart forwardly to raise the wheels from the ground and to bring the bag supporting plate into contact with the ground, and then with the same hand moves the handle downwardly, thus collapsing the wheel carrying frame. In this collapsed condition the wheels are parallel with each other, and using the bracket 9 as a handle the golf cart can be rolled from the golf course to an automobile for placement in the trunk of the automobile.

The handle 11 is preferably tubular so that the rod 20 is concealed therein.

Having thus described my invention, what I claim as new and desire to secure by Letters Patent is:

1. In a golf cart, a standard having a bag support at its lower end, an expandible, collapsible wheel carrying frame mounted on said standard, a bracket fixed to the upper end of the fram, having side flanges and having recesses opening through its rear ends, a tubular handle having its front end pivoted between said flanges and having longitudinal slots in opposite wall portions, a locking rod extending through said slots and having grooves the walls of which overhang the walls of said slots to prevent transverse movement of the locking rod on the handle, a spring tending to move said locking rod into said recesses, a releasing rod within said handle having its front end connected with said locking rod, said handle having at its rear end a grasping portion and a longitudinal slot near the grasping portion, a trigger pivoted to the rear end of the releasing rod and tensioned to be normally retained in the slot at the grasping portion, and a linkage between the handle and frame, whereby when one hand of the operator raises the handle the cart tips forwardly on the bag support and raises the wheels off the ground, and when the same hand of the operator draws the trigger rearwardly and moves the handle downwardly the frame is collapsed.

2. The construction defined in claim 1, wherein at the rear end of the locking rod slots, the handle has an aperture opening through opposite wall portions and into said slots to provide for the assembly of the locking rod in its slots.

References Cited in the file of this patent

UNITED STATES PATENTS

| | | |
|---|---|---|
| 1,754,407 | Stearman | Apr. 15, 1930 |
| 2,478,512 | Taylor | Aug. 9, 1949 |
| 2,513,055 | Samuelson | June 27, 1950 |
| 2,571,390 | Strand | Oct. 16, 1951 |
| 2,626,815 | Chamberlin | Jan. 27, 1953 |
| 2,761,691 | George | Sept. 4, 1956 |
| 2,854,243 | Freeling | Sept. 30, 1958 |

FOREIGN PATENTS

| | | |
|---|---|---|
| 626,969 | Great Britain | July 25, 1949 |